Figure 4:
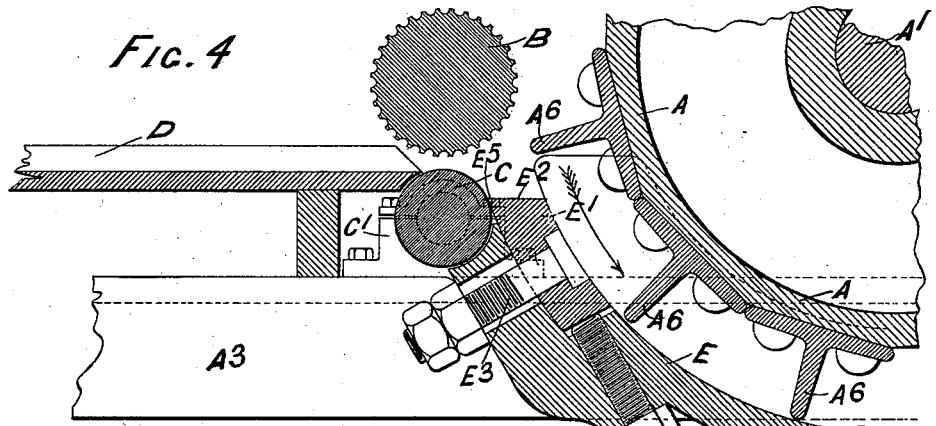

(No Model.) 3 Sheets—Sheet 1.
J. C. WALKER & J. E. STEPHENSON.
MACHINE FOR DECORTICATING FIBROUS PLANTS, STEMS, OR LEAVES.
No. 536,495. Patented Mar. 26, 1895.
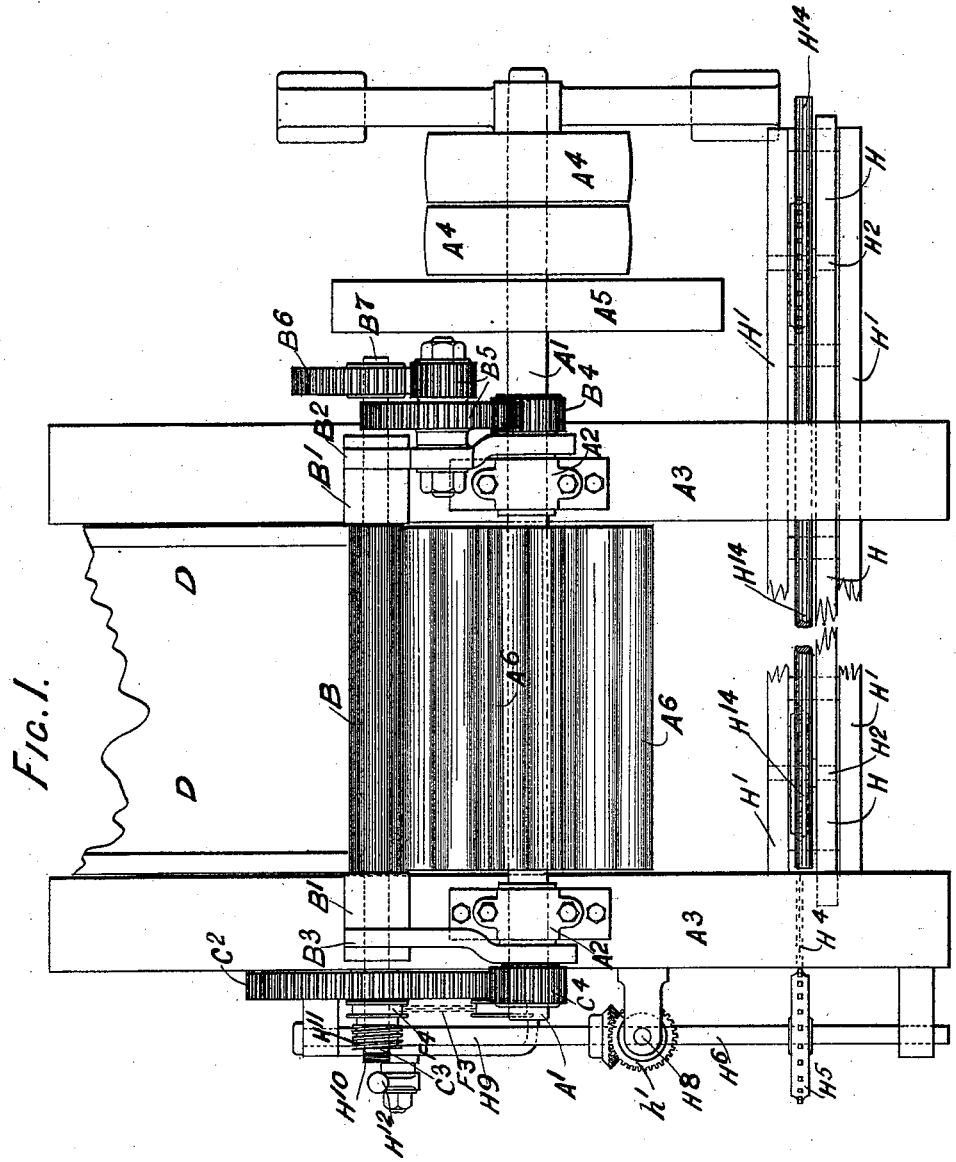
Witnesses:
Thomas Durant
Wallace Murdock
Inventors:
John C. Walker and
Jonathan E. Stephenson
by Church & Church
their Attys.

(No Model.) 3 Sheets—Sheet 2.
J. C. WALKER & J. E. STEPHENSON.
MACHINE FOR DECORTICATING FIBROUS PLANTS, STEMS, OR LEAVES.
No. 536,495. Patented Mar. 26, 1895.
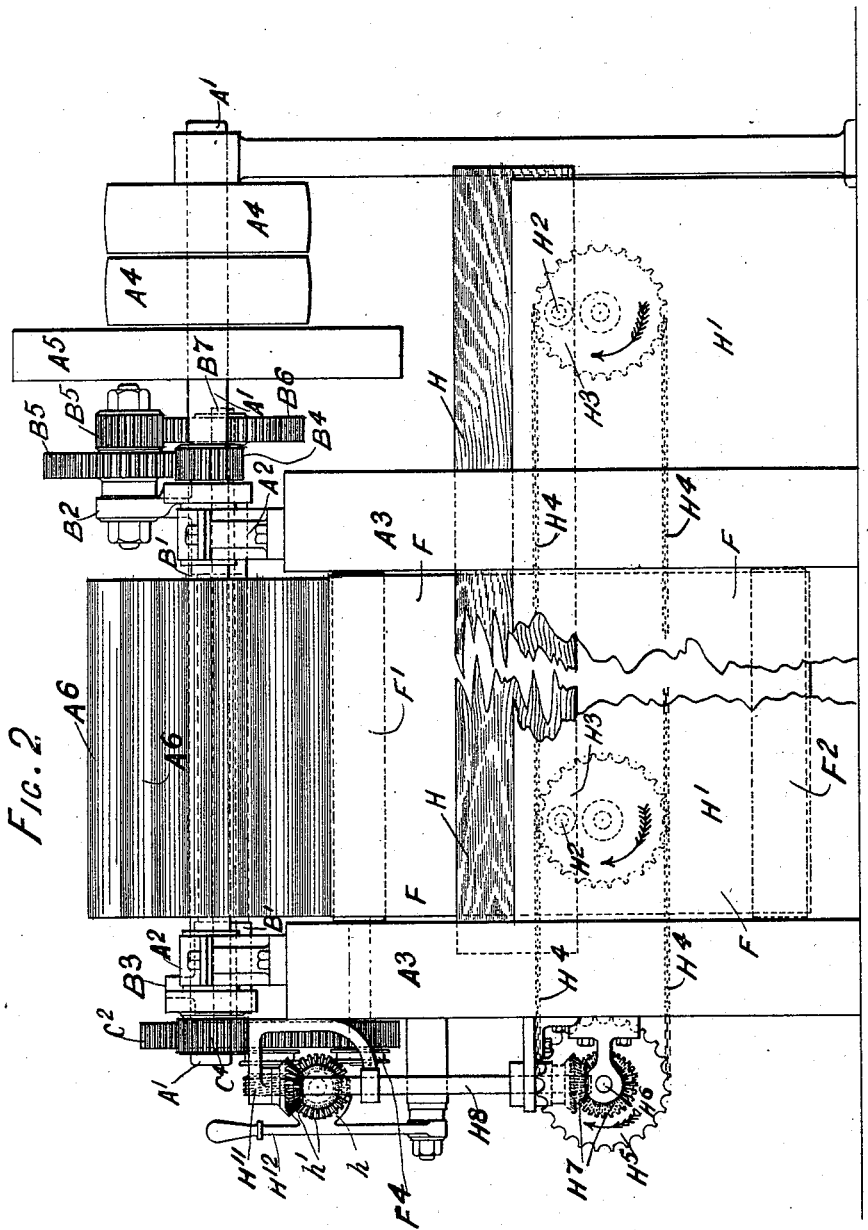

(No Model.) 3 Sheets—Sheet 3.

J. C. WALKER & J. E. STEPHENSON.
MACHINE FOR DECORTICATING FIBROUS PLANTS, STEMS, OR LEAVES.

No. 536,495. Patented Mar. 26, 1895.

Witnesses:
Thomas Durant
Wallace Murdock

Inventors:
John C. Walker and
Jonathan E. Stephenson
by Church & Church
their Attys.

THE NORRIS PETERS CO., PHOTO-LITHO., WASHINGTON, D. C.

UNITED STATES PATENT OFFICE.

JOHN C. WALKER AND JONATHAN EDWARD STEPHENSON, OF SHIPLEY, ENGLAND.

MACHINE FOR DECORTICATING FIBROUS PLANTS, STEMS, OR LEAVES.

SPECIFICATION forming part of Letters Patent No. 536,495, dated March 26, 1895.

Application filed June 9, 1894. Serial No. 514,099. (No model.) Patented in England July 19, 1893, No. 13,983.

*To all whom it may concern:*

Be it known that we, JOHN CHARLES WALKER and JONATHAN EDWARD STEPHENSON, subjects of the Queen of England, residing at Shipley, near Bradford, England, have invented certain Improvements in Machines for Decorticating Fibrous Plants, Stems, and Leaves, (for which we have obtained Letters Patent in Great Britain, No. 13,983, dated July 19, 1893,) of which the following is a specification.

This invention relates to improvements in machinery for decorticating fibrous plants, stems or leaves particularly applicable to that type of machine in which a rotary beater having radial beater arms is arranged to act upon the stems or the like while they are fed over a bed or counter-beater and the primary object of the invention is to provide a more positive feed capable of dealing with plants, stems or leaves varying considerably both in thickness and density or tenacity. For this purpose we employ a pair of feed rollers one or both of which may be fluted and instead of directly gearing these rollers together we drive them by independent gearing of any suitable description so that however widely said rollers may be parted by plants, stems or leaves passing between them they are both positively driven. An adjustable scraper may be provided particularly when plain rollers are employed to prevent any portion of the plants or foreign matter introduced therewith from adhering to the roller or rollers. We find a fluted upper roller mounted in movable bearings regulated by weights or springs arranged in conjunction with a plain bottom roller revolving in rigid bearings and provided with a scraper at the back next to the beater an efficient arrangement. When a curved bed or counter-beater is employed concentric with the beater we prefer to form the top or edge of said bed first meeting the beater of an adjustable steel plate which may be removed and ground to renew this edge.

A further object of our invention is to provide a simple arrangement for moving the decorticated fibers away as they leave the machine. For this purpose we allow the fibers as they leave the machine to drop across a support with one end hanging down on each side; but to move the fibers along as they accumulate we employ a bar or its equivalent preferably arranged in a space or groove in said support open at the top. This bar is mounted upon cranks or their equivalent so arranged that it may be periodically raised above said support, thereby raising the fibers, and at the same time moving them forward, by the action of the cranks or their equivalent. The bar carries the fibers with it before again dropping them upon the support. Said bar may be operated automatically. To remove the fibers from the support a rod or pole may be placed preferably alongside said bar and the fibers be lifted by it and carried away with it.

Figure 3:
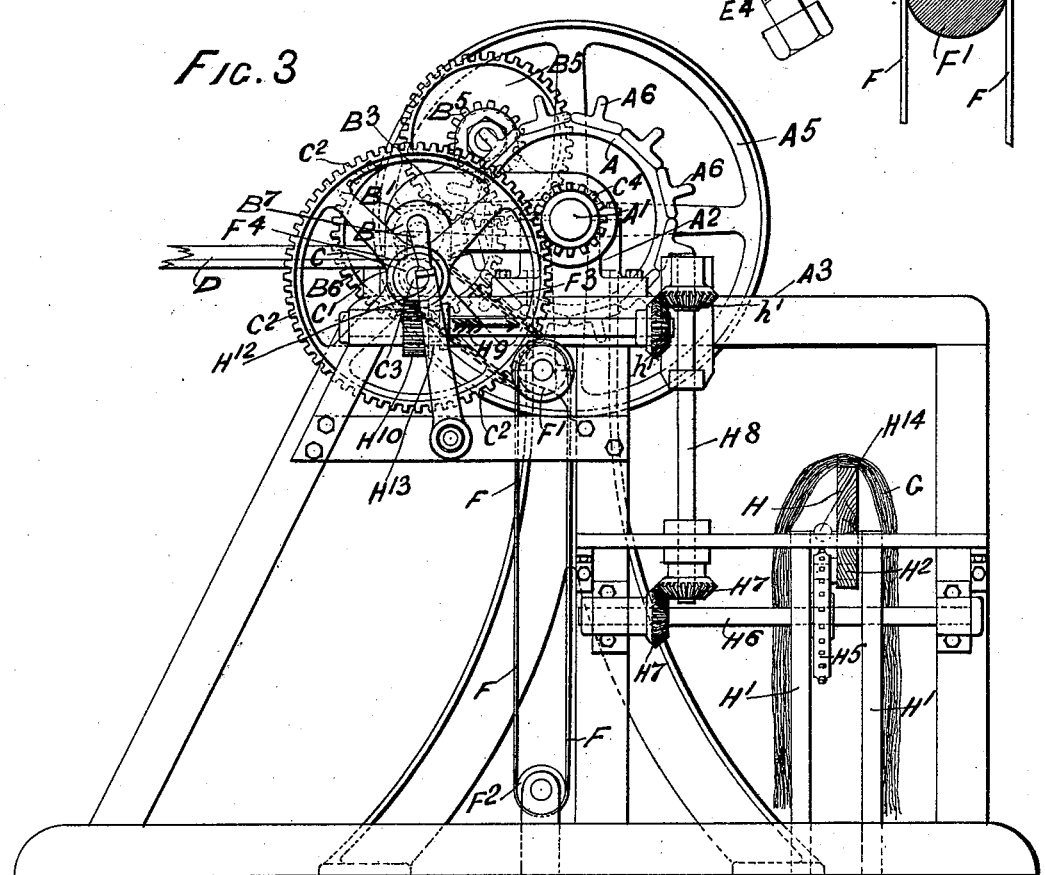

In the accompanying sheets of drawings Figure 1, represents a plan view of a decorticating machine constructed in accordance with our improvements. The feed table and a portion of the framework at the feed side are shown broken away to economize space. Fig. 2, represents an elevation of the delivery end of the machine. Fig. 3, represents a side view of the same. Fig. 4, represents a cross-section on a larger scale of a portion of the beater and the counter-beater and certain other parts.

The beater A is fixed upon the driving shaft A′ mounted in bearings $A^2$ secured to the side frames $A^3$ of the machine. The cross stays of the framework are omitted so as to show the other parts more clearly. The driving shaft is provided with fast and loose driving pulleys $A^4$ and a fly wheel $A^5$. The upper feed roller B is mounted in bearings B′ formed at the end of the arms $B^2$ and $B^3$ pivoted upon the shaft A′ and this roller is driven from said driving shaft by the spur wheel $B^4$, fixed on the latter, engaging the double stud wheel $B^5$ carried by $B^2$ and this stud wheel communicates motion to the toothed wheel $B^6$ fixed upon the shaft $B^7$ of the roller B. The lower feed roller C is mounted in bearings C′ secured to the side frames and is driven by the wheel $C^2$ secured on its shaft $C^3$ engaging the spur wheel $C^4$ on A′.

The stems or other material to be treated are placed on the table D and being introduced between the feed rollers B and C are fed thereby over the counter-beater E, and the projections $A^6$ of the rapidly revolving beater A operating in the ordinary manner draw the stems down over the concentric face of the counter-beater and strike out and remove the pulpy and other non-fibrous portion of the material treated. The rollers B and C being close up to the beater A the full lengths of the stems with the exception of a very small portion at the latter end are thoroughly decorticated in this way and the end first operated upon hangs down against the endless revolving apron F (provided to prevent accumulations of pulpy and sticky matter at the bottom of the counter-beater) and when the stems are completely through the rollers the upper end travels with the beater down the counter-beater and is thrown off the end with considerable jerk. This is not new but is described so as to explain the manner the stems are delivered onto the receiving apparatus in the manner shown by G Fig. 3 which represents the decorticated stems lying across the carrier H with their ends hanging down on either side.

The carrier H consists of a rod or bar inclosed, with the exception of the top, by the side of the support H', H' and is mounted upon the crank pin $H^2$, $H^2$ of the crank disks $H^3$, $H^3$. The crank disks $H^3$, $H^3$ have a rotary motion imparted to them by the endless chain $H^4$ operated by the sprocket wheel $H^5$ mounted on the shaft $H^6$. The shaft $H^6$ is driven by the bevel wheels $H^7$, $H^7$, the vertical shaft $H^8$, the horizontal shaft $H^9$, and the worm wheel thereon $H^{10}$ engaging the worm $H^{11}$ on the shaft $C^3$. A hand lever $H^{12}$ is provided with a claw piece $h$ engaging the annular groove $H^{13}$ in the boss of the wheel $H^{10}$ and this wheel is so arranged that it may be moved by said hand lever along the shaft $H^9$ in the direction of the arrow Fig. 3 so as to disengage it from the worm $H^{11}$ and thus put the mechanism out of gear if desired. The bevel wheels $h'$ connect the shafts $H^8$ and $H^9$. The object of this mechanism is to impart a rising and falling as well as a reciprocating movement to the carrier H, and at each revolution of the disks $H^3$ the top of the carrier passes below the top of the sides H' and while the lower part is reciprocated in one direction the fibrous material for the time being rests entirely upon the sides H' but the further revolution of $H^3$ raises H above H' and consequently lifts the fibrous material and as the carrier is at the same time reciprocated in the reverse direction to that when it is below the sides the fibrous material is carried along with it a certain distance before being deposited on H' again. A rod $H^{14}$ (Fig. 3) may be placed on the top of H' to enable the fibers to be readily lifted and carried away when required.

The upper portion E' of the counter-beater E is preferably made adjustable as shown in Fig. 4 so as to allow for the upper edge $E^2$ being ground when reduced by wear. A series of bolts $E^3$ are employed to securely clamp the adjustable piece E' to E and set screws $E^4$ are also employed to withstand the downward pressure. The top corner $E^5$ of E' is also designed to act as a scraper to keep the roller C clean although any ordinary and well known form of scraper may be employed for this purpose.

The apron F is mounted upon rollers F' and $F^2$, and the roller F' is driven by the chain $F^3$ from the sprocket wheel $F^4$ on the shaft $C^3$.

The roller B may be pressed toward the roller C with a suitable pressure by the weight of the roller and arms $B^2$ and $B^3$, which arms may be weighted for the purpose in any well known manner.

We claim—

1. In a decorticating machine, the combination with the rotary beater and its shaft and the counter beater, of the feed rolls, movable toward and from each other, and independent gearing between said feed rolls and beater shaft; substantially as described.

2. In a decorticating machine, the combination with the rotary beater and its shaft and the counter beater, of the feed rolls, the arms journaled on the beater shaft and carrying one feed roll and gearing between the said feed roll and shaft, whereby it is driven irrespective of its position with relation to the other feed roll; substantially as described.

3. In a decorticating machine, the combination with the rotary beater and its shaft and the counter beater, of the feed rolls, the arms journaled on the beater shaft and carrying one feed roll, the gears on the beater shaft, and feed roll, the intermediate gear or idler on one of the arms and independent gearing between the beater shaft and other feed roll; substantially as described.

4. In a decorticating machine, the combination with the rotary beater and feed rolls, one mounted in fixed bearings of the counter beater having the removable section at the edge, and adjusting screws for raising or lowering said section with relation to the feed roll without varying its distance from the rotary beater; substantially as described.

5. In a decorticating machine, the combination with the rotary beater and feed rolls, one mounted in fixed bearings, of the curved counter beater, the removable section of said beater whereby one edge forms a scraper for the roll and the other a breaker edge for the fiber interposed between the fixed feed roll and beater, a bolt for holding said section in place and an adjusting screw for raising and lowering the same; substantially as described.

6. In a decorticating machine, the combination with the beater and counter beater of the conveyer over which the fibers are cast by the beater consisting of the fixed rail and the movable rail driven by a crank and working forward above the fixed rail and rearward below the fixed rail; substantially as described.

In testimony whereof we have hereunto set our hands in the presence of the two subscribing witnesses.

JOHN C. WALKER.
JONATHAN EDWARD STEPHENSON.

Witnesses:
DAVID NOWELL,
SAMUEL A. DRECUP.